US006999066B2

(12) United States Patent
Litwiller

(10) Patent No.: US 6,999,066 B2
(45) Date of Patent: Feb. 14, 2006

(54) SYSTEM FOR AUDIBLE FEEDBACK FOR TOUCH SCREEN DISPLAYS

(75) Inventor: Debora Margaret Hejza Litwiller, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 231 days.

(21) Appl. No.: 10/179,530

(22) Filed: Jun. 24, 2002

(65) Prior Publication Data

US 2003/0234824 A1 Dec. 25, 2003

(51) Int. Cl.
*G06F 3/00* (2006.01)

(52) U.S. Cl. ................ 345/173; 715/865; 715/820; 715/727

(58) Field of Classification Search ........... 345/173, 345/174, 175, 7, 8; 715/716, 727, 729, 810, 715/817, 820, 854, 865; 340/825.19
See application file for complete search history.

(56) References Cited

U.S. PATENT DOCUMENTS

| 5,225,920 A | 7/1993 | Kasazumi et al. |
| 5,287,102 A | 2/1994 | McKiel, Jr. |
| 5,412,189 A | 5/1995 | Cragun |
| 5,479,191 A | 12/1995 | Komatsu |
| 5,533,182 A | 7/1996 | Bates et al. |
| 5,543,897 A | 8/1996 | Altrieth, III |
| 5,556,283 A | 9/1996 | Stendardo et al. |
| 5,589,855 A * | 12/1996 | Blumstein et al. .......... 345/173 |
| 5,601,432 A | 2/1997 | Bergman |
| 5,621,906 A | 4/1997 | O'Neill et al. |
| 5,714,978 A | 2/1998 | Yamanaka et al. |
| 5,740,390 A | 4/1998 | Pickover et al. |
| 5,742,779 A | 4/1998 | Steele et al. |
| 5,748,177 A | 5/1998 | Baker et al. |
| 5,825,353 A | 10/1998 | Will |
| 5,896,129 A | 4/1999 | Murphy et al. |
| 5,943,043 A | 8/1999 | Furuhata et al. |
| 5,977,867 A | 11/1999 | Blouin |
| 6,049,328 A | 4/2000 | Vanderheiden |
| 6,061,666 A | 5/2000 | Do et al. |
| 6,068,485 A | 5/2000 | Linebarger et al. |
| 6,115,482 A * | 9/2000 | Sears et al. ................ 382/114 |
| 6,140,913 A | 10/2000 | Okada et al. |
| 6,219,034 B1 | 4/2001 | Elbing et al. |
| 6,262,717 B1 * | 7/2001 | Donohue et al. ........... 345/173 |
| 6,267,598 B1 | 7/2001 | Allen et al. |
| 6,278,441 B1 | 8/2001 | Gouzman et al. |
| 6,309,305 B1 | 10/2001 | Kraft |
| 6,362,813 B1 | 3/2002 | Worn et al. |
| 6,384,743 B1 | 5/2002 | Vanderheiden |
| 6,424,338 B1 | 7/2002 | Anderson |
| 6,464,135 B1 * | 10/2002 | Cohen et al. ............... 235/379 |
| 6,469,712 B1 * | 10/2002 | Hilpert et al. .............. 715/727 |
| 6,474,547 B1 | 11/2002 | Suzuki |
| 6,489,951 B1 | 12/2002 | Wong et al. |
| 6,496,182 B1 | 12/2002 | Wong et al. |
| 6,502,032 B1 | 12/2002 | Newman |
| 6,527,171 B1 * | 3/2003 | Brooks et al. .............. 235/379 |
| 6,532,005 B1 | 3/2003 | Campbell |
| 6,559,866 B1 | 5/2003 | Kolde et al. |
| 6,603,461 B1 | 8/2003 | Smith et al. |
| 6,624,803 B1 | 9/2003 | Vanderheiden et al. |
| 6,636,202 B1 | 10/2003 | Ishamael et al. |
| 6,639,577 B1 | 10/2003 | Eberhard |
| 6,665,173 B1 | 12/2003 | Brandenberg et al. |
| 6,690,391 B1 | 2/2004 | Kim et al. |
| 6,717,528 B1 | 4/2004 | Burleson et al. |

(Continued)

OTHER PUBLICATIONS

U.S. Appl. No. 10/113,105, filed Mar. 29, 2002, entitled "Tactile Overlays for Screens".

*Primary Examiner*—Xiao Wu
*Assistant Examiner*—Jean Lesperance

(57) ABSTRACT

What is presented is a system and method by which a visually impaired worker could easily and quickly navigate menu options on touch screen displays. An Audible Feedback ON/OFF Switch is provided which turns the audible feedback feature of the present invention on or off. The software monitoring which row/column areas of the touch screen's display grid have been touched by the user in response to a menu option selection is made switchable into one of two modes. A first mode is when the audible feedback feature is OFF or otherwise disabled. In this mode the software operates the touch screen's menu selections in the normal manner in which the machine is intended to perform. When a user selects an option, the option is immediately activated whether it be a machine activity or a jump to another level of menus. A second mode is when the audible feedback feature has been turned ON or otherwise activated. In this mode a two step process is activated such that when a user makes a first touch of a menu option a sound or voice is audibly played indicating the nature of the particular menu option just selected. A second consecutive touch of the same menu option then actually activates the machine activity associated with that particular menu option.

7 Claims, No Drawings

U.S. PATENT DOCUMENTS

| | | |
|---|---|---|
| 6,717,600 B1 | 4/2004 | Dutta et al. |
| 2001/0020904 A1 | 9/2001 | Dayle |
| 2002/0075317 A1 | 6/2002 | Dardick |
| 2002/0158836 A1 | 10/2002 | Ishmael et al. |
| 2002/0158920 A1 | 10/2002 | Abrams |
| 2002/0163543 A1 | 11/2002 | Oshikin |
| 2003/0043196 A1 | 3/2003 | Gibson |
| 2003/0071859 A1 | 4/2003 | Takami et al. |
| 2003/0098892 A1 | 5/2003 | Hiipakka |
| 2003/0184524 A1 | 10/2003 | Stohrer et al. |
| 2003/0234763 A1 | 12/2003 | Litwiller |
| 2004/0051746 A1 | 3/2004 | Hejza Litwiller |
| 2004/0061677 A1 | 4/2004 | Hejza Litwiller |

* cited by examiner

SYSTEM FOR AUDIBLE FEEDBACK FOR TOUCH SCREEN DISPLAYS

RELATED CASES

Cross reference is made to the following application filed concurrently: Application Ser. No. 10/179,555 entitled "SYSTEM FOR AUDIBLE FEEDBACK FOR TOUCH SCREEN DISPLAYS" by Debora Margaret Hejza Litwiller.

FIELD OF THE INVENTION

The present invention is directed to systems and methods which enable visually impaired persons to use equipment and, in particular, those systems and methods which by the provision of audible feedback, enable visually impaired users to navigate touch screen menu displays typically associated with office machines and other such equipment.

BACKGROUND OF THE INVENTION

People that are visually impaired often have difficulty operating office equipment such as copier machines with touch screen displays because the touch screen selections are have to be first read before the appropriate selection can be made. If the user of the copier machine is visually impaired then relying on the ability to clearly read the touch screen selections may not be adequate to ensure accuracy of the selected options made by the user. In addition, the visually impaired user needs to be able to quickly and easily navigate the various levels of menu options often found on touch screen displays.

What is needed in the art are touch screen displays for office equipment among others which enable users with visual impairments to understand what the various touch screen menu selections are so as to allow such users to traverse menu options thereon to select the options and operations they need to have the equipment perform and make use of such displays without assistance from others.

SUMMARY OF THE INVENTION

What is presented is a system and method by which a visually impaired worker could easily and quickly navigate menu options on touch screen displays. An Audible Feedback ON/OFF Switch is provided which turns the audible feedback feature of the present invention on or off. The software monitoring which row/column areas of the touch screen's display grid have been touched by the user selecting a menu option is switched into one of two modes. A first mode is when the audible feedback feature is OFF or otherwise disabled. In this mode the software operates the touch screen's menu selections in the normal manner in which the machine is intended to perform. When a user selects an option, the option is immediately activated whether it be a machine activity or a jump to another level of menus. A second mode is when the audible feedback feature has been turned ON or otherwise activated. In this mode a two step process is activated such that when a user makes a first touch of a menu option a sound or voice is audibly played indicating the nature of the particular menu option just selected. A second consecutive touch of the same menu option then actually activates the machine activity associated with that particular menu option.

DETAILED DESCRIPTION OF THE INVENTION

What is presented is a system and method by which a visually impaired worker could easily and quickly navigate and select menu options on touch screen displays by listening to audio feedback associated with the selection of each menu option.

An Audible Feedback ON/OFF switch is provided which turns the audible feedback feature of the present invention on or off. The software monitoring which row/column areas of the touch screen's display grid have been touched by the user selecting a menu option is switched into one of two modes. A first mode is active when the audible feedback feature is OFF or otherwise disabled. In this mode the software operates the touch screen's menu selections in the normal manner in which the machine is intended to perform. In other words, when a user selects a menu option from the machine's touch screen display the machine activity associated with that option is immediately initiated whether it be a machine option such as selecting a different paper tray or a jump to another level of menu options. A second mode is when the audible feedback feature has been turned ON or otherwise enabled. In this mode the software monitoring which row/column areas of the touch screen's display grid have been touch by the user in response to a menu option selection is toggled to initiate a two step process wherein upon a user making a first touch of an active grid menu option on the touch screen display audible feedback is provided indicating to the user the nature of the particular menu option just selected. The activation of the machine activity associated with that menu option is not immediately initiated. A second consecutive touch of the same menu option by the user then activates that particular activity associated therewith.

Normally, software associated with touch screen displays is in a state monitoring the inputs waiting for a selection to be made by the user's touch of a menu option on the machine's touch screen display. Upon receiving a signal from the touch screen display as to the identity of the menu option touched by the user the monitoring software thereafter initiates that appropriate machine response or activity associated with that particular menu option. For instance, if the selection by the user was to have the machine use a particular paper tray then upon the display's associated menu option being touched by the user, the software would initiate one or more internal mechanisms within the machine or device to ensure that the correct tray of paper was in place and ready for use per the user's intention. Note that the various internal mechanisms associated with the activities or actions initiated by the user upon selecting a specific menu option on the touch screen display, unless otherwise discussed herein, is outside the scope of the present invention. Such inter-activity between software and hardware would be specific to each machine or device as would the menu options made available to the user thereof. Suffice it to say that the software would actuate the appropriate response whether it be a hardware feature being enabled/disabled or another level of menu selections being made available on the touch screen display for presentation of additional options for selection.

In accordance with the teachings herein, an implementation of the present invention would require a modification to software associated with the touch screen display such that, when the audible feedback feature of the present invention is enabled, preferably by an ON/OFF switch associated therewith, an audible sound (such as an alt text attribute)

would be played for the user that preferably describes the element or option just touched. The user would hear the description of the menu selection just touched. Nothing in terms of machine activity would be initiated at this point. If the user decides upon hearing the description of the selection just touched that it was the correct one desired then upon a second touch of the same menu option, the monitoring software would activate the appropriate machine activity or response associated with that chosen menu option. If the user decides that the selection just touched was not the one desired they could then proceed to touch other options on the touch screen display and listen to the audible feedback for each of these menu selections. Once the user came across a selection they desired they would press the desired selection again to activate the option.

In accordance with the present invention, the software monitoring the touch inputs made to the touch screen display is to be modified by one skilled in the art so that the grid element being touched initiates a two step process when the audible feedback is activated. The first menu selection causes the monitoring software to provide audible feedback which identifies the menu option just touched by the user. The audible feedback is provided without the software actually activating that particular menu option itself. Upon a second selection of the same menu option by the visually impaired user the software would then initiated the selected machine activity. One skilled in the art of computer programming, depending on the particular implementation of a touch screen display associated with a particular device, would readily be able to modify the software monitoring the touch screen display's inputs so that a branch command or sub-routine would be activated when the audible feedback feature is enabled. An example of pseudo-code to enable the features of the present invention are:

1. Wait for First Input from touch screen display.
2. Save first received input as First Touched Option.
3. If audible feedback option currently enabled then
4. Retrieve audio associated with First Touched Option
5. Play retrieved audible feedback for said First Touched Option
6. Wait for Second Input from touch screen display
7. Save second received input as Second Touched Option
8. If First Touched Option NOT EQUAL TO Second Touched Option then
9. Make First Touched Option same as Second Touched Option
10. Goto line 4 to retrieve audio associated with First Touched Option.
11. Process activity associated with user selected First Touched Option
12. Return to top of loop waiting for First input from touch screen display In line 1, the program is in a loop waiting for input to be received from the touch screen display. Once a user makes a selection from the touch screen display, control passes to line 2 wherein the menu option chosen by the user is stored in a variable called First Touched Option for later comparison purposes. At line 3, a quick test is made to determine the current state of audible feedback feature. If it is NOT active or otherwise enabled, then control passes down to line 11 wherein the activity associated with the user's menu selection is processed. In line 12, control is passed back to line 1 to start over again. If, at line 3, the audible feedback feature IS ENABLED then at line 4 the audio file or audio mechanism associated with the First Touched Menu Option is identified and retrieved or created. In line 5, the audio feedback for the First Touched Option is played back to the user so that the visually impaired user could identify which menu option they just selected. Control then passes to line 6 wherein another loop is entered waiting for another input to the touch screen display to be made by the user. In line 7, upon receipt of another input from the display the second input is saved in a variable called Second Input Option. In line 8, a test is done to compare the Second Input Option to the First Input Option. If the two selected menu options are NOT the same then the user has selected a menu option different from the first selected menu option. In line 9, the variable containing the First Touched Option is SET EQUAL to the Second Touched Option. In line 10, control then passes back to line 4 so that the audio associated with the First Touched Option can be obtained and played for the user. Control then passes to line 11 and the process repeats itself. If, in line 8, the First Touched Option IS EQUAL to the Second Touched Option then the user has selected the same menu option as the first option selected. In this instance, control drops through to line 11 wherein the activity associated with the user's menu selection is processed. In line 12, control is passed back to line 1 to start cover again waiting for input from the touch screen display. One skilled in the arts of software controls associated with monitored input from touch screen displays would readily be able to implement the teachings of the present invention from the above pseudo-code in their respective applications.

In summary, a touched menu option would, upon a first touch, provide a voice or other audible feedback as to which selection was just touched so that the visually impaired user would understand which selection they just made on the touch screen display. Since the software controlling the touch screen display already has knowledge of which option was selected by the user, the software could readily have a link via alt text or other mechanisms that initiates access to an associated MP3 file or other sound file containing one or more speech segments associated with that display menu option selection and subsequently play that file for the user. For instance, if the user selected the Paper-Tray menu option from the touch screen display then, when enabled by the ON/OFF switch associated with the audible feedback feature of the present invention, the software would activate the appropriate file which would speak the words: "PAPER-TRAY" to the user. This would be done without activating the associated machine activity. In other words, no machine activity associated with the paper tray menu selection would be activated merely upon a first touch selection being made. As such when the audible feedback feature is turned ON, a first touch of any menu option by the user causes the display software to provide audible feedback as to the selection made. If this option were indeed the one desired by the visually impaired user, then they would touch that same menu option a second time whereupon the software controller would then cause the machine to act or respond accordingly to the selection made. In addition, a second audible feedback can be provided, for instance, speaking the words: "PAPER-TRAY SELECTED."

In such a manner, the visually impaired user could press the individual grid areas of the touch screen display enabled with the audible feedback feature of the present invention to receive feedback (or other instructions) as to the menu option just touched. If there is no menu option at a specific row/column grid location on the touch screen display then preferably nothing happens or, in the alternative, a sound could be played indicating, for example, that "NO OPTION" exists at this location on the touch screen display. In the instance where a specific menu option leads to a second set of display options, the software would provide audible feedback such as, for example, "PAPER TRAY SELECTION MENU" or otherwise audibly indicating to the user that they have now navigated to another level in the hierarchy of the touch screen's display menu. In this new level in the menu hierarchy, the software would again act in a manner similar to the previous menu level by audibly indicating which menu selection option was just touched by the visually impaired user and, if the identical menu selection is touched a second time in a consecutive manner then activating the associated machine activity or response. Optionally, audible feedback could also being provided upon the second consecutive menu selection to indicate that the desired activity is currently in progress or provide other instructions or notifications.

When a non-visually impaired user approaches the piece of office equipment which was just used by a visually impaired office-mate, that person could turn the audible feedback feature OFF and thus proceed to operate the equipment as they would normally. The visually impaired office worker would only have to be instructed as to where the audible feedback feature ON/OFF switch was positioned or located on the equipment so that they could turn the feature ON/OFF. Additionally, an audible feedback sound file could readily be associated with the ON/OFF switch itself saying, for example, "AUDIBLE FEEDBACK ENABLED" or "AUDIBLE FEEDBACK ON", or otherwise indicating to the user the state of the switch itself.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is claimed is:

1. A system for providing audible feedback to enable a visually impaired person to operate a multi-function machine, comprising:

touchable elements means for selecting a plurality of selectable system options associated with features of the multi-function machine;

audible feedback means for generating electrical signals that provide audible instructions to the visually impaired person as to one or more options are selected;

means for enabling/disabling said audible feedback means such that when said audible feedback means is disabled, no electrical signals corresponding to the audible instructions to the visually impaired person are generated and when said audible feedback means is enabled, electrical signals corresponding to the audible instructions to the visually impaired person are generated; and a controller to control navigation of said selectable system options and to provide instructions for the operation of the multi-function machine;

said controller checking whether audible feedback is disabled;

said controller, if said audible feedback is disabled, activating a process associated with a selection made on said touchable elements;

said controller providing audible feedback corresponding to the selection made when said audible feedback is enabled;

said controller, when said audible feedback is enabled, comparing the selection made with a previous selection made;

said controller providing, when said audible feedback is enabled and the selection made and the previous selection made are different, only audible feedback corresponding to the selection made and not activating the process associated with the selection made;

said controller, if the selection made and the previous selection made are the same, providing audible feedback corresponding to the selection made and activating a process associated with the selection made.

2. The system as claimed in claim 1, wherein said touchable elements menu means comprises a touch screen display for navigating menu selections and machine operations thereof.

3. The system as claimed in claim 1, wherein said audible feedback means comprises at least one sound generation mechanism.

4. The system as claimed in claim 1, wherein said means for enabling/disabling said audible feedback means comprises a selectable button switch, said selectable button switch causing said audible feedback means to be disabled when initiating a first state and enabled when initiating a second state.

5. The system as claimed in claim 1, wherein the multi-function business machine comprises at least one from the set of printers, scanners, faxes, copiers, and manufacturing and production equipment.

6. The system as claimed in claim 5, wherein said audible feedback means indicating that the audible feedback has been disabled when said selectable button switch initiates the first state.

7. The system as claimed in claim 1, wherein said audible feedback means provides audible feedback as to an identity of a menu selection option just touched.

* * * * *